United States Patent [19]

Vancraeynest

[11] Patent Number: 5,020,079
[45] Date of Patent: May 28, 1991

[54] APPARATUS FOR GENERATING A MINIMUM-SHIFT-KEYING SIGNAL

[75] Inventor: Jan Vancraeynest, White Plains, N.Y.

[73] Assignee: Nynex Corporation, New York, N.Y.

[21] Appl. No.: 438,511

[22] Filed: Nov. 17, 1989

[51] Int. Cl.⁵ .......................................... H04L 27/12
[52] U.S. Cl. ...................... 375/64; 332/100; 455/118
[58] Field of Search .................. 375/45, 47, 62, 64, 375/65; 332/100, 101; 455/118

[56] References Cited

U.S. PATENT DOCUMENTS

| | | | |
|---|---|---|---|
| 3,731,233 | 5/1973 | Hutchinson | 332/101 |
| 3,761,625 | 9/1973 | Bruene | 332/100 |
| 3,993,868 | 11/1976 | Balcewicz | 332/100 |
| 4,068,198 | 1/1978 | Otto | 332/100 |

Primary Examiner—Benedict V. Safourek
Attorney, Agent, or Firm—Douglas J. Kirk; John J. Torrente

[57] ABSTRACT

Apparatus for generating an MSK signal by using a dual modulus frequency divider which divides an incoming digital clock signal of frequency $f_0$ by the factors n and (n+1) in dependence on the data type of the data to be transmitted and in which the frequency $f_0$, the data rate $f_d$ and the factor n are such as to satisfy the relationship $f_d = f_0 \cdot 2/(n(n+1))$.

10 Claims, 1 Drawing Sheet

APPARATUS FOR GENERATING A MINIMUM-SHIFT-KEYING SIGNAL

BACKGROUND OF THE INVENTION

This invention relates to modulation techniques in digital communications and, in particular, to an apparatus for generating minimum-shift-keying (MSK) digital modulation signals.

MSK is a well established form of digital modulation in digital communication systems. With MSK, different data types as, for example, data type "0" (commonly referred to as a space) and data type "1" (commonly referred to as a mark) are associated with different frequencies, e.g., $f_1$ and $f_2$, which are transmitted as indicative of the data. It is known that to obtain the desirable spectral efficiency offered by MSK, the generating apparatus must generate the frequencies $f_1$ and $f_2$ with a specific relationship. In particular, the two frequencies must be generated so that they differ by one-half the modulation or data rate $f_d$.

In the prior art MSK apparatuses, a variety of serial or parallel modulation schemes have been used. These schemes require relatively complex oscillator arrangements and quadrature networks, as illustrated by the schemes disclosed by Peebles, P.Z., Digital Communication Systems, Prentice Hall, ISBN 0-13-211970-6, pp 274–291. Conceptually more simplified arrangements are disclosed by Amoroso, F., and Kivett, J.A., in an article entitled Simplified MSK Signaling Technique, IEEE Trans. Comm., Vol. COM-25, No. 4, Apr. 1977, pp. 433–441. These arrangements, however, require a special matched filter, typically realized by surface acoustic wave technology and, thus, not readily available to everyone. Even more simplified arrangements employ a voltage controlled oscillator modulated by the data and having a frequency deviation of plus or minus one-quarter of the data rate. Such arrangements, however, have the usual problems of deviation linearity and stability.

It is, therefore, a primary object of the present invention to provide a simple but reliable apparatus for generating MSK signals.

It is a further object of the present invention to provide an apparatus for generating MSK signals using digital techniques, allowing adjustment-free operation and flexibility with respect to data rate.

SUMMARY OF THE INVENTION

In accordance with the principles of the present invention, the above and other objects are realized in an apparatus comprising a frequency divider means which divides the frequency of an incoming digital clock signal of frequency $f_0$ by a first integer n or by a second integer (n+1), in dependence on whether the data being transmitted is a first or second type of data. By arranging the apparatus such that the frequency $f_0$, the data rate $f_d$ and the value n satisfy the relationship $f_d = f_0 \cdot 2/(n(n+1))$, the resultant output from the digital frequency divider is controlled to be an MSK signal.

In the embodiment of the invention to be disclosed hereinafter, a further frequency divider means is provided. This further frequency divider is also responsive to the digital clock signal and divides the frequency $f_0$ of the clock signal by the factor $n(n+1)/2$. The output of the further frequency divider is then used to control the data source such that the aforementioned relationship between $f_0$, $f_d$ and n is realized.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
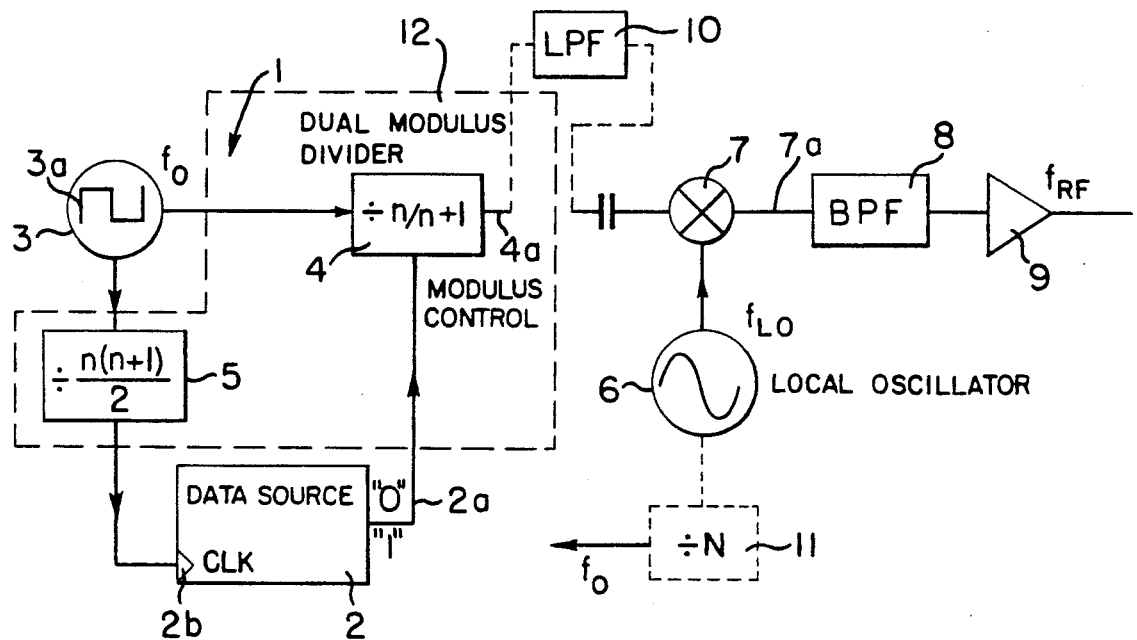
FIG. 1 shows apparatus for generating an MSK signal in accordance with the principles of the present invention.

In FIG. 1, an apparatus 1 for generating an MSK signal in accordance with principles of the invention is shown. The apparatus 1 comprises a data source 2 which generates a first type of data, e.g., "0" data and a second type of data, e.g., "1" data, on line 2a at a data rate $f_d$ corresponding to a period $T_d$. This data is to be transmitted as an MSK signal in which a frequency $f_1$ corresponds to the "0" data and a frequency $f_2$ corresponds to the "1" data over the data period.

In the apparatus 1 of FIG. 1, an MSK signal with the frequencies $f_1$ and $f_2$ is developed from a clock signal 3a generated by a digital clock or oscillator 3 operating at the frequency $f_0$. The clock signal 3a at the frequency $f_0$ is coupled to a dual modulus digital frequency divider 4 which divides the frequency of the signal 3a by either the factor n or the factor (n+1), depending upon the type of data on the line 2a being transmitted. In the case shown, when the data is a "1", the divider 4 divides the signal 3a by n so that a frequency f2 equal to $f_0/n$ is generated and when the data is a "0", the divider divides the signal 3a by the factor (n+1) so that a frequency $f_1$ equal to $f_0/(n+1)$ is generated. The signal 4a from the divider thus comprises the desired frequencies $f_1$ and $f_2$ associated with the data types "1" and "0". Because of the nature of operation of the continuously running dual modulus divider 4, phase continuity at transitions between $f_1$ and $f_2$ (i.e., data "1" and "0") is assured.

As above indicated, in order for the signal 4a to be a proper MSK signal, the frequencies $f_1$ and $f_2$ must differ by one-half the modulation rate $f_d$. Accordingly, in accordance with the principles of the present invention, the clock source 3, divider 4 and data source 2 are adapted such that the following relationship exists between the parameters $f_0$, n and $f_d$: $f_d = f_0 \cdot 2/(n(n+1))$.

In the case shown, this relationship is realized by controlling the clock input 2b of the data source 2. The latter input 2b, in turn, controls the data rate $f_d$ of the data source 2 so that the data rate conforms to the frequency of the signal applied to the input. As shown, the signal inputted to the input 2a is derived from a further digital frequency divider 5 which also acts on the clock signal 3a of the clock signal source 3. The divider 5 divides the frequency $f_0$ of the signal 3a by the factor $n(n+1)/2$ so that a signal at the frequency $f_0 \cdot 2/(n(n+1))$ is generated and applied to the input 2b. The data rate $f_d$ is thus controlled to be at the latter frequency.

Figure 2:
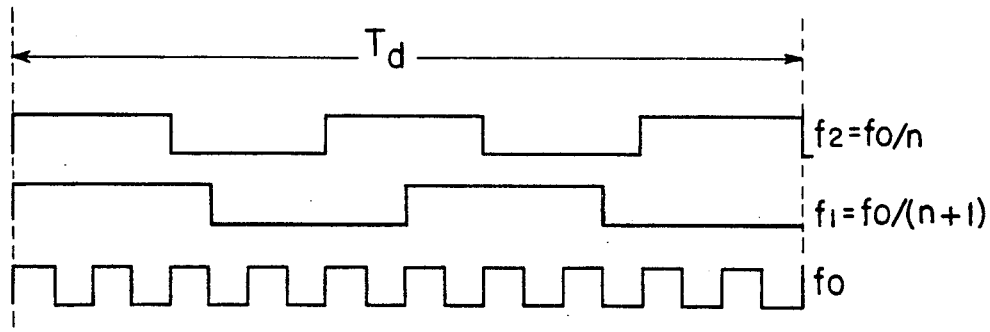
FIG. 2 shows waveforms for signals generated in the apparatus of FIG. 1.

FIG. 2 shows the frequency signals $f_0$, $f_2$ and $f_1$ developed by the clock 3 and divider 4 over the period $T_d$. The case shown is for n equal to 4. As can be seen, the frequency signals $f_1$ and $f_2$ have a 50 percent duty cycle. To make it easier for the divider 4 to realize a 50 percent duty cycle at the n and (n+1) division factors, the clock frequency $f_0$ and the division ratios n and (n+1) and n(n+1)/2 can be multiplied by a common factor, preferrably the factor two, so that all division ratios are even and a 50 percent duty cycle is easily achieved as is well known to those skilled in the art.

Digital dual modulus frequency divider 4 may be any conventionally made digital divider. For certain standard division factors such dividers are available as off-the-shelf items. For non-standard division factors, the divider can be readily fabricated utilizing standard digital design procedures.

In the case shown in FIG. 1, the MSK signal 4a from the divider 4 is upconverted by mixing the signal, after removal of its DC component by a capacitor C, in a mixer 7 with a local oscillator signal. The latter signal is at a frequency $f_{LO}$ and is generated by local oscillator 6. The value of capacitor C should be chosen large enough not to affect a signal at frequency $f_1 = f_0/(n+1)$. As shown in dotted line, prior to upconverting the MSK signal, the signal may be passed through a low pass filter 10 to reduce any harmonics and signal imperfections such as ripple and overshoot of the digital signal.

The upconverted signal 7a from the mixer 7 is passed through a bandpass filter 8 which filters from the signal either the lower or upper sideband. The filtered signal is then amplified in amplifier 9 for radio frequency transmission at the frequency $f_{RF}$.

To facilitate filtering of the undesired sideband in the filter 8, the division factor n of the divider 4 should be selected sufficiently large so that $f_m >> f_d$, where $f_m$ is the center frequency of the MSK baseband signal and is given as:

$$f_m = f_0 \cdot (2n+1)/(2n(n+1)) = f_d \cdot (2n+1)/4$$

It is preferable in practice that this condition be satisfied by making $n \geq 4$.

It also should be noted that if there is latitude in the selection of the frequency $f_{LO}$ and/or the data rate $f_d$, the apparatus 1 can be further adapted to permit the clock signal 3a to be derived directly from the local oscillator 6 by use of an additional divider 11 which divides the local oscillator signal 3a by N. For this to occur, the following must be satisfied:

$$f_{RF} = f_{LO}(1 \pm (2n+1)/(2n(n+1)N))$$

where the + sign yields the upper side band and the − sign the lower side band. In this case, the data rate $f_d$ and the frequency $f_{RF}$ are related via the factors n and N.

In all cases it is understood that the above-identified arrangements are merely illustrative of the many possible specific embodiments which represent applications of the present invention. Numerous and varied other arrangements can readily be devised in accordance with the principles of the present invention without departing from the spirit and scope of the invention. Thus, for example, the frequency dividers 4 and 5 in FIG. 1 may be implemented as one single state machine 12 as shown in dotted line in FIG. 1.

What is claimed is:

1. Apparatus for generating an MSK signal indicative of data comprised of first and second data types and whose data rate corresponds to a frequency $f_d$, comprising:

means for generating a digital clock signal of preselected frequency $f_0$;

frequency divider means adapted to be responsive to said data and responsive to said digital clock signal for generating said MSK signal by dividing the frequency $f_0$ of said digital clock signal by a first integer n when said data is of said first data type and for dividing the frequency $f_0$ of said digital clock signal by a second integer equal to (n+1) when said data is of said second data type, said integer n being such as to satisfy the relationship $f_d = f_0 \cdot 2/(n(n+1))$;

a local oscillator for generating a local oscillator signal at a frequency $f_{LO}$ which is higher than that of said frequency divider means;

means for multiplying said MSK signal generated by said frequency divider means by said local oscillator signal;

and said means for generating said digital clock signal being responsive to said local oscillator signal and comprising further divider means for dividing the frequency $f_{LO}$ of said local oscillator signal to generate said digital clock signal.

2. Apparatus in accordance with claim 1 further comprising:

further divider means responsive to said digital clock signal for dividing the frequency of said digital clock signal by the factor n(n+1)/2;

and means for generating said data at said frequency $f_d$, said data generating means being responsive to the signal from said further divider means.

3. Apparatus in accordance with claim 1 wherein:

said frequency divider means is a digital dual modulus frequency divider.

4. Apparatus in accordance with claim 3 wherein:

said frequency divider means and further frequency divider means are implemented as one single state-machine.

5. Apparatus in accordance claim 1 wherein:

$n \geq 4$.

6. Apparatus in accordance with claim 1 further comprising:

filter means for filtering the output signal of said multiplying means.

7. Apparatus in accordance with claim 6 wherein:

$n \geq 4$.

8. Apparatus in accordance with claim 1 wherein:

said data is digital.

9. Apparatus in accordance with claim 8 wherein:

said first data type is "1" data and said second data type is "0" data.

10. Apparatus in accordance with claim 1 wherein:

said further frequency divider means divides the frequency $f_{LO}$ of said local oscillator signal by an integer N, and wherein the relationship between the local oscillator frequency $f_{LO}$, the frequency $f_{RF}$ of the upper and lower sidebands of the signal from said multiplying means and the integers N and n is as follows:

$$f_{RF} = f_{LO}(1 \pm (2n+1)/(2n(n+1)N))$$

where the + sign corresponds to the upper sideband frequency and the − sign the lower sideband frequency of the multiplied signal.

* * * * *